(12) United States Patent
Halstead et al.

(10) Patent No.: US 12,367,748 B2
(45) Date of Patent: *Jul. 22, 2025

(54) SECURITY CAMERAS WITH THERMAL IMAGING SENSORS

(71) Applicant: CALUMINO PTY LTD, Eveleigh (AU)

(72) Inventors: Mark Halstead, Auckland (NZ); Marek Steffanson, Mosman (AU)

(73) Assignee: Calumino Pty Ltd., Eveleigh (AU)

( * ) Notice: Subject to any disclaimer, the term of this patent is extended or adjusted under 35 U.S.C. 154(b) by 298 days.

This patent is subject to a terminal disclaimer.

(21) Appl. No.: 17/725,939

(22) Filed: Apr. 21, 2022

(65) Prior Publication Data

US 2022/0246005 A1    Aug. 4, 2022

Related U.S. Application Data

(63) Continuation of application No. 16/899,093, filed on Jun. 11, 2020, now Pat. No. 11,335,174.

(60) Provisional application No. 62/861,093, filed on Jun. 13, 2019.

(51) Int. Cl.
| | | |
|---|---|---|
| *G08B 13/19* | (2006.01) | |
| *G08B 13/196* | (2006.01) | |
| *H04N 23/23* | (2023.01) | |

(52) U.S. Cl.
CPC ... *G08B 13/19628* (2013.01); *G08B 13/1963* (2013.01); *H04N 23/23* (2023.01)

(58) Field of Classification Search
USPC .......................................... 348/152
See application file for complete search history.

(56) References Cited

U.S. PATENT DOCUMENTS

| | | | |
|---|---|---|---|
| 10,819,905 B1 * | 10/2020 | Liu | H04N 23/80 |
| 11,335,174 B2 | 5/2022 | Halstead et al. | |
| 2020/0007824 A1 * | 1/2020 | Henry | H04N 7/181 |
| 2020/0394883 A1 | 12/2020 | Halstead et al. | |

* cited by examiner

*Primary Examiner* — Mikhail Itskovich
(74) *Attorney, Agent, or Firm* — Greenberg Traurig

(57) ABSTRACT

The disclosed techniques include systems and methods for implementing security cameras with thermal imaging sensors. The disclosed techniques can utilize a thermal imaging sensor (TIS) and a less robust passive infrared (PIR) sensor of a security camera system to monitor a field of view.

15 Claims, 7 Drawing Sheets

500

Running security camera in low-power mode and waiting for triggering event
(e.g., waiting for a sensor of camera to detect motion or certain increase in temperature)
502

Identifying, by the camera, the triggering event (e.g., identifying the triggering event
via receiving a software or hardware interrupt or via polling)
504

Recording, by thermal image sensor (TIS) of the camera, TIS data in a field of view,
in response to identifying the triggering event
506

Analyzing the TIS data (and optionally analyze feedback), by a computing device in the
camera or linked to the camera
(e.g., including compare TIS data to previous TIS data)
508

Additional recording? 509
N

Y

Recording, by the security camera (e.g., by CMOS sensor in the camera), image(s)
or video in the field of view, while the camera is running in active mode
510

Transmitting, by the security camera, the image(s) or video to a security hub system
512

FIG. 5

SECURITY CAMERAS WITH THERMAL IMAGING SENSORS

RELATED APPLICATIONS

The present application is a continuation application of U.S. patent application Ser. No. 16/899,093 filed Jun. 11, 2020 and issued as U.S. Pat. No. 11,335,174 on May 17, 2022, which claims priority to Prov. U.S. Pat. App. Ser. No. 62/861,093 filed Jun. 13, 2019, the entire disclosures of which applications are hereby incorporated herein by reference.

TECHNICAL FIELD

Embodiments of the disclosure relate to security cameras with thermal imaging sensors.

BACKGROUND

A video camera sensor package can include a CMOS video sensor for monitoring a scene, a light emitting diode (LED) for illuminating the scene, a passive infrared (PIR) sensor for detecting presence of a person or motion in the scene, a transmitter capable of sending video over the Internet or another computer network, and a battery. To save battery power, such packages can use the PIR sensor to detect presence of a person or motion. The CMOS sensor and transmission device can be powered down until a positive input from the PIR sensor is detected. Upon receiving a positive input, the CMOS sensor, transmission device and LED can be powered up and video frames can be transmitted.

Issues with such camera systems can include the PIR sensor providing false positives. The PIR sensor is a simple passive device that can detect overall temperature changes in its field of view. It is not able to precisely pinpoint the location of the temperature change or perform further analysis. False alarms can therefore be caused by the PIR sensor triggering on insignificant events, such as events where video recording is not wanted. The PIR sensor is not sophisticated enough to detect and distinguish significant events from insignificant events, so triggering errors occur often. This can lead to poor energy management (e.g., reduced battery life). Inefficient power consumption can be caused by triggering events occurring more often than wanted or needed. The video and transmission devices are powered up unnecessarily and consume significant energy. And, the active near IR LED illumination used by a CMOS imaging device can consume additional energy.

Also, when the system is triggered on insignificant events, frames of video are sent unnecessarily and consume upstream resources to collect, store and analyze the video. For both significant and insignificant events, video frames can be sent at the resolution of the imaging device. This can cause overconsumption of energy, bandwidth, and resources to collect, store and analyze such data. And, there is no mechanism by which the region of interest in the video can be identified and sent in isolation with known security cameras.

Also, such systems can lack information about the event that triggered the video collection, when the security hub initially receives the captured information. A PIR sensor temperature change can be recorded for a field of view, but analysis or filtering is usually not included with the transmission of the PIR sensor data. The receiving system or human operator must then scan the entire video image to identify the area of interest (or not, in the case of a false alarm). Also, a PIR sensor is generally limited to the detection of temperature change over a short time period (e.g., temperature change caused by a warm object passing across the field of view).

SUMMARY

Examples of the systems and methods disclosed herein utilizing security cameras with thermal imaging sensors provide specific technical solutions to at least the technical problems mentioned in the background section and other parts of the application as well as other technical problems not described herein but recognized by those of skill in the art.

The disclosed techniques can utilize a combination of known security camera systems and thermal imaging sensors.

In some embodiments, the techniques can include a method including running a security camera in a low-power mode and identifying a triggering event while the camera is running in the low-power mode. The method can include recording in a field of view, by a thermal image sensor (TIS) of the camera, TIS data. The recording of the TIS data can occur in response to identifying a triggering event, and the TIS data is derived from infrared radiation. The method can also include analyzing, by a computing device in the camera or communicatively coupled to the camera, the TIS data to determine whether to perform additional recording in the field of view by the camera. The method can also include recording in the field of view, by a video recorder of the camera, a video while the camera is running in an active mode, in response to determining to perform additional recording in the field of view. The video is derived from radiation within the visible light spectrum. The method can also include transmitting, by a transmitter of the camera, the video to a security hub system. In some embodiments, the video recorder can include a CMOS image sensor.

In some embodiments, the triggering event can include a sensor of the camera detecting motion in the field of view. The sensor of the camera detecting the motion in the field of view can include a passive infrared sensor (PIR sensor).

In some embodiments, the triggering event can include a sensor of the camera detecting a certain increase in temperature in the field of view. The sensor of the camera detecting the certain increase in temperature in the field of view can include a passive infrared sensor (PIR sensor).

In some embodiments, the analyzing the TIS data can include analyzing feedback on the TIS data from an analytical source external to the security camera.

In some embodiments, the analyzing the TIS data can include comparing the TIS data to previous TIS data.

In some embodiments, the analyzing the TIS data includes determining a region of interest (ROI) and determining whether to perform additional recording in the field of view according to the ROI.

In some embodiments, the method can include initiating running the security camera in the active mode, in response to determining to perform additional recording in the field of view. The video is derived from radiation within the visible light spectrum. The initiating running the security camera in the active mode can include activating the video recorder and a light emitting diode of the camera that emits light in the field of view. Also, the initiating running the security camera in the active mode can include activating the transmitter.

In some embodiments, the method can include executing the TIS at selected intervals of time (e.g., executing the TIS for one second every minute, executing the TIS every other minute, etc.). In such embodiments, the method can include recording in the field of view, by the TIS, the TIS data during the selected intervals of time.

In some embodiments, the triggering event can include a sensor of the camera detecting a level of sound over a threshold in the field of view. In some embodiments, the triggering event can include a sensor of the camera detecting a level of air quality over a threshold in the field of view. In some embodiments, the triggering event can include an accelerometer detecting motion in the field of view (e.g., accelerometer on a smart fence).

In some embodiments, the techniques can include an apparatus that can include a security camera configured to run in a plurality of modes. The modes include a low-power mode and an active mode. The apparatus can also include an event handler of the camera configured to identify a triggering event while the camera is running in the lower-power mode. The apparatus can also include a thermal image sensor (TIS) of the camera, configured to record, in a field of view, TIS data in response to identifying the triggering event. The TIS data is derived from infrared radiation. The apparatus can also include a computing device in the camera or communicatively coupled to the camera, configured to analyze the TIS data to determine whether to perform additional recording in the field of view by the camera. The apparatus can also include a video recorder of the camera, configured to record, in the field of view, a video while the camera is running in the active mode, in response to the computing device determining to perform additional recording in the field of view by the camera. The apparatus can also include a transmitter of the camera, configured to transmit the video to a security hub system. The apparatus can also include a passive infrared sensor (PIR sensor) of the camera configured to detect motion or a certain increase in temperature in the field of view, and the triggering event can include the PIR sensor detecting motion or a certain increase in temperature in the field of view.

In some embodiments, the techniques can include a system that includes one or more networked computers, each having at least part of a security hub system. The system also includes a security camera, configured to run in a plurality of modes including a low-power mode and an active mode. The system can also include an event handler of the camera, configured to identify a triggering event while the camera is running in the lower-power mode. The system can also include a thermal image sensor (TIS) of the camera, configured to record, in a field of view, TIS data in response to identifying the triggering event. The TIS data is derived from infrared radiation. The system can also include a computing device in the camera or communicatively coupled to the camera, configured to analyze the TIS data to determine whether to perform additional recording in the field of view by the camera. The system can also include a video recorder of the camera, configured to record, in the field of view, a video while the camera is running in the active mode, in response to the computing device determining to perform additional recording in the field of view by the camera. The system can also include a transmitter of the camera, configured to transmit video over the network to the security hub system.

Some of the technologies described herein include a computer system. The computer system can implement the features and operations of the aforesaid methods and the aforesaid medium. The medium can specifically be implemented by memory of the system. The computer system can also include the processing device.

BRIEF DESCRIPTION OF THE DRAWINGS

The present disclosure will be understood more fully from the detailed description given below and from the accompanying drawings of various embodiments of the disclosure.

FIGS. 5, 6, and 7 are flow diagrams of example methods that utilize security cameras having thermal imaging sensors, in accordance with some embodiments of the present disclosure.

DETAILED DESCRIPTION

Figure 1:
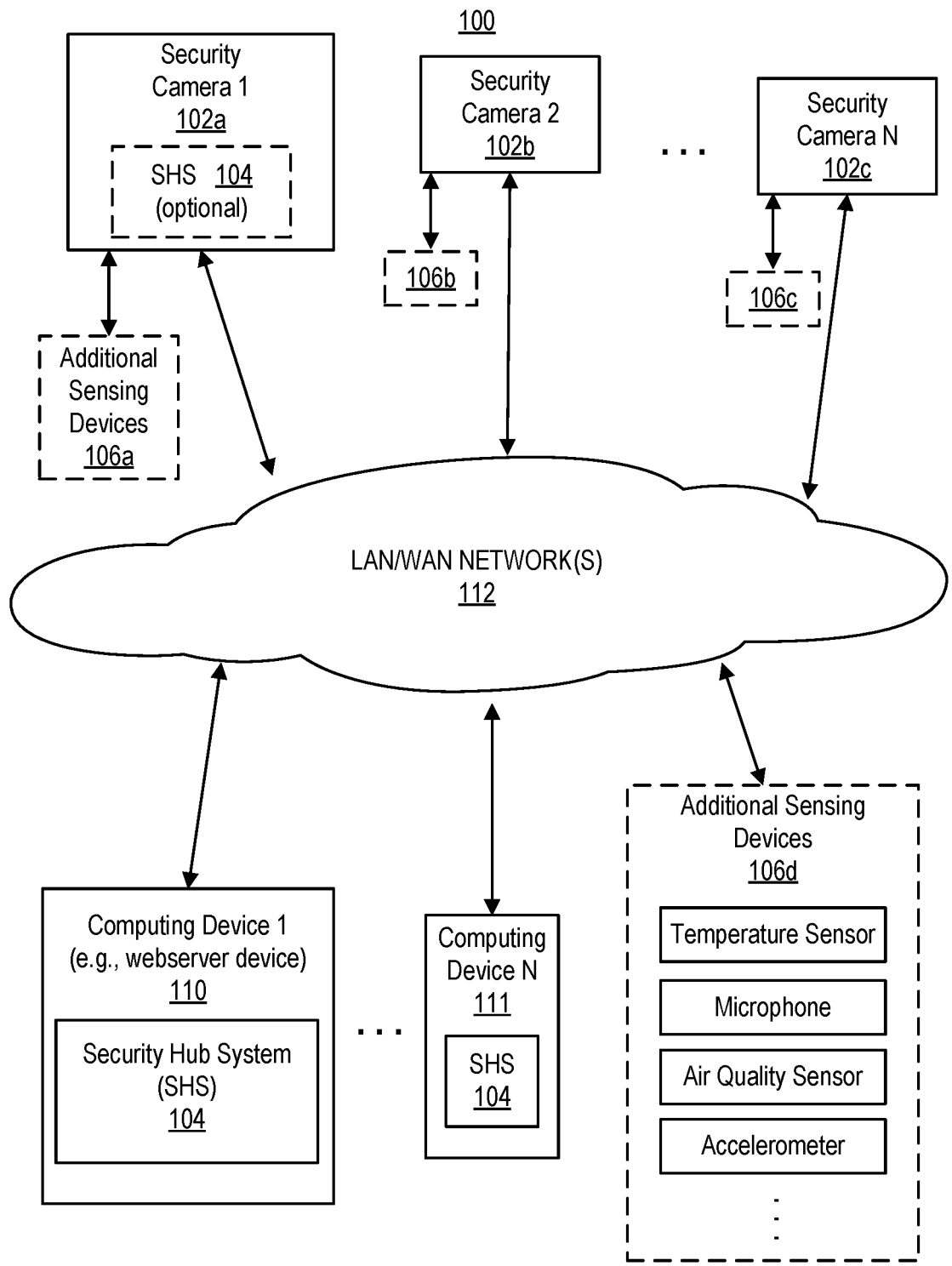
FIG. 1 illustrates an example network of security cameras, computer systems, and sensing devices, in accordance with some embodiments of the present disclosure.

The disclosed techniques herein include systems and methods for implementing security cameras with thermal imaging sensors. The disclosed techniques provide specific technical solutions to at least the technical problems mentioned in the background section and other parts of the application as well as other technical problems not described herein but recognized by those of skill in the art. The disclosed techniques can utilize a thermal imaging sensor (TIS) and a less robust passive infrared (PIR) sensor of a security camera system to monitor a field of view.

In some embodiments, a PIR sensor of a security camera system can be replaced with a TIS. In such examples, the TIS assumes the role of the PIR, in that it observes the scene and emits a trigger signal when a significant event is observed in the scene. The trigger signal can lead to powering up a video recorder of the camera system (e.g., the recorder including a CMOS image sensor) as well as powering up a network communications device of the system.

In some embodiments, the PIR sensor is retained, and the camera system includes both a PIR sensor and a TIS (e.g., the TIS is downstream of the PIR sensor and powered up by the trigger caused by the PIR sensor). The TIS, when powered, can observe the scene and make a determination of significant events to provide its own trigger. The trigger from the TIS can directly power up a video recorder and a network communications device. The TIS and additional logic can occur as an intermediate to the PIR sensor and the video recorder.

The TIS can provide more accurate detection of events than the PIR sensor. But, the TIS can provide lower resolution than the video recorder. The TIS can distinguish significant events (such as person entering room, or person moving towards the camera system) from insignificant events (such as person passing by a room or person not approaching the camera system). The TIS can reduce false triggering of the power consuming video capture, LED illumination, and video transmission.

Also, the TIS can be configured to make advanced decisions about presence, motion, and points of interest locally.

Previously, such decisions were made after transmitting video for remote processing. This was done due to the complexity of extracting information from video within the camera system.

An example scenario to improve upon includes a truck or car driving past an environment monitored by a camera having a PIR sensor, and the PIR sensor causing false alarms. A TIS added to the camera, in such a scenario, can provide analysis and limit false alarms. Another scenario can include a cat or other animal in the environment or field of view. A TIS can distinguish the shape of such an animal from that of a human and limit false alarms. Also, a person in the environment or field of view may just be passing by. In such a situation, an alarm or triggering may not be wanted. However, in a situation where a person is approaching, an alarm or triggering may be wanted. A TIS can distinguish between such events and can trigger video recording and alerts accordingly. A TIS can also identify a hotspot, when the TIS detects a high temperature reading (such as in a region of interest). This can trigger video recording and/or an alarm immediately.

Some embodiments can include a PIR sensor. Others embodiment may not have a PIR sensor. Without a PIR sensor the TIS can activate periodically to check the environment for significant changes since previous observations. The TIS can be activated periodically to check for developing hotspots or significant motion or heat blobs within a scene. One possible implementation for simply detecting changes is to subtract the current heat map from a previous heat map (or a heat map derived from a set of previous maps) to detect developing heat blobs, hotspots, or motion.

With use of a PIR sensor, the TIS can activate upon a trigger from the PIR sensor and observe the environment for a certain period of time (e.g., a certain number of seconds). Computer vision (CV) algorithms operating locally to the camera system can analyze captured TIS data for significant events. The CV algorithms can include algorithms that can distinguish a human from an animal or other non-human heat source (such as vehicle, sunlight, etc.). The CV algorithms can include algorithms that can distinguish motion towards the security camera from motion perpendicular to line of site of the security camera. The CV algorithms can include algorithms that can identify unexpected situations, such as multiple persons in a room, or a person lying on the floor. The CV algorithms can also include algorithms that can identify anomalous events, such as an unexpected hotspot or hotspot in a known dangerous location. The CV algorithms can occur locally with respect to the TIS or the security camera or remotely at a device external to the camera.

In some embodiments, the TIS data is transmitted to a remote hub for processing. This can reduce the use of local resources of the camera. For complex CV algorithms this can increase battery life of a battery-powered camera. Also, TIS data is lower resolution than video, so transmitting just the TIS data can save bandwidth, power, and processing resources. Whereas transmitting a video uses more power, processing resources, and bandwidth of the network. After processing the TIS data at a remote hub, a signal may be sent back to the camera to start recording and transmission of a video.

In some embodiments, the camera can include a PIR sensor and a TIS, and the TIS is triggered by the PIR sensor when the PIR sensor senses a certain amount of temperature increase or motion, and the triggering causes the TIS to power up. TIS data is transmitted to the hub where it is processed and analyzed for significant events. A signal is sent back to the camera to indicate whether the camera is to power down the TIS (e.g., when the event was insignificant by not exceeding a threshold) or power up the video recorder (e.g., CMOS image sensor), record a video, and send the video to the hub (e.g., when the event was significant by exceeding a threshold).

In some embodiments, a part of the camera, such as a computing device installed in the camera, can execute CV algorithms locally and then transmit, to the data hub, only the processed output derived from output of the TIS. The remote hub receives, records and processes the processed output and can instruct the camera to activate the video recorder, record a video, and to send the video. The hub can also instruct the camera or one or more parts of the camera to power down. The processed data from the TIS can be transmitted to the hub over a wired or wireless short- or long-range communications technology.

In some embodiments, a part of the camera can determine region of interest (ROI) information within TIS data. This can also be done at the remote hub. The ROI may be determined by image subtraction or CV analysis of TIS data locally at the camera or remotely at the hub. The ROI can be used to reduce the cost of transmitting video data by transmitting only video data of the ROI. Also, with transmitting only the data of the ROI to the receiving hub, the hub's resources are used at a reduced amount since analysis of the video data is concentrated on analysis of the ROI. The ROI can also have a higher resolution than the complete video recording, which can provide for significant resource savings as well.

The receiving hub and a user interface connected to the hub can render the ROI on a display. This can allow a user to more readily analyze video data from the camera and observe significant events.

In some embodiments, the CV algorithms running on the camera or the remote hub are tuned for improved performance by receiving feedback on one or more events. For example, if a computing device of the camera or hub determines a significant event, but receives feedback that the event was not significant from a user, the camera can alter future determination behavior of the computing device. The feedback can be from further computer analysis of the event at the hub or the camera, or from a user observing the event streams and associated video.

In some embodiments, additional sensor types can replace or augment the TIS and/or the PIR sensor. For example, the camera or hub can include or be connected to a temperature sensor, an acoustic wave sensor, an air quality sensor, a lidar, a scanner, and/or an accelerometer to name some examples. An accelerometer attached to a part of the system can include an accelerometer attached to a smart fence. For example, in some embodiments, when motion of a fence is detected by an accelerometer, the detection can trigger the TIS that captures data on a possible significant event, which in turn triggers the video recording on the event if it is determined as significant according to a threshold.

FIG. 1 illustrates an example network of computer systems, security cameras, and sensing devices (i.e., the system 100), in accordance with some embodiments of the present disclosure. The system 100 can implement any of the aforesaid components and operations as well as any of the components or operations described herein.

The system 100 is shown including security cameras that each have a TIS (e.g., see security camera 102a, security camera 102b, and security camera 102c). It is also shown that a security camera in the system 100 can include at least part of a security hub system 104 (e.g., see security camera 102*a*). The security hub system 104 (SHS 104) can implement the data processing described herein.

A part of the security hub system 104 can be included in or connected to an additional sensing device such as one of additional sensing devices 106*a*, 106*b*, 106*c*, and/or 106*d*. The additional sensing devices (e.g., additional sensing devices 106*a*, 106*b*, 106*c*, and 106*d*) can include a temperature sensor, an acoustical wave sensor, a microphone, an air quality sensor, an accelerometer, or any other type of sensor with connectivity. As shown in FIG. 1, additional sensing devices 106*a*, 106*b*, 106*c*, and 106*d* can be directly connected to a security camera (e.g., security camera 102*a*, 102*b*, or 102*c*) or indirectly connected to a security camera via one or more local area networks and/or wide area networks (e.g., one or more local area networks and/or wide area networks 112).

Figure 2:
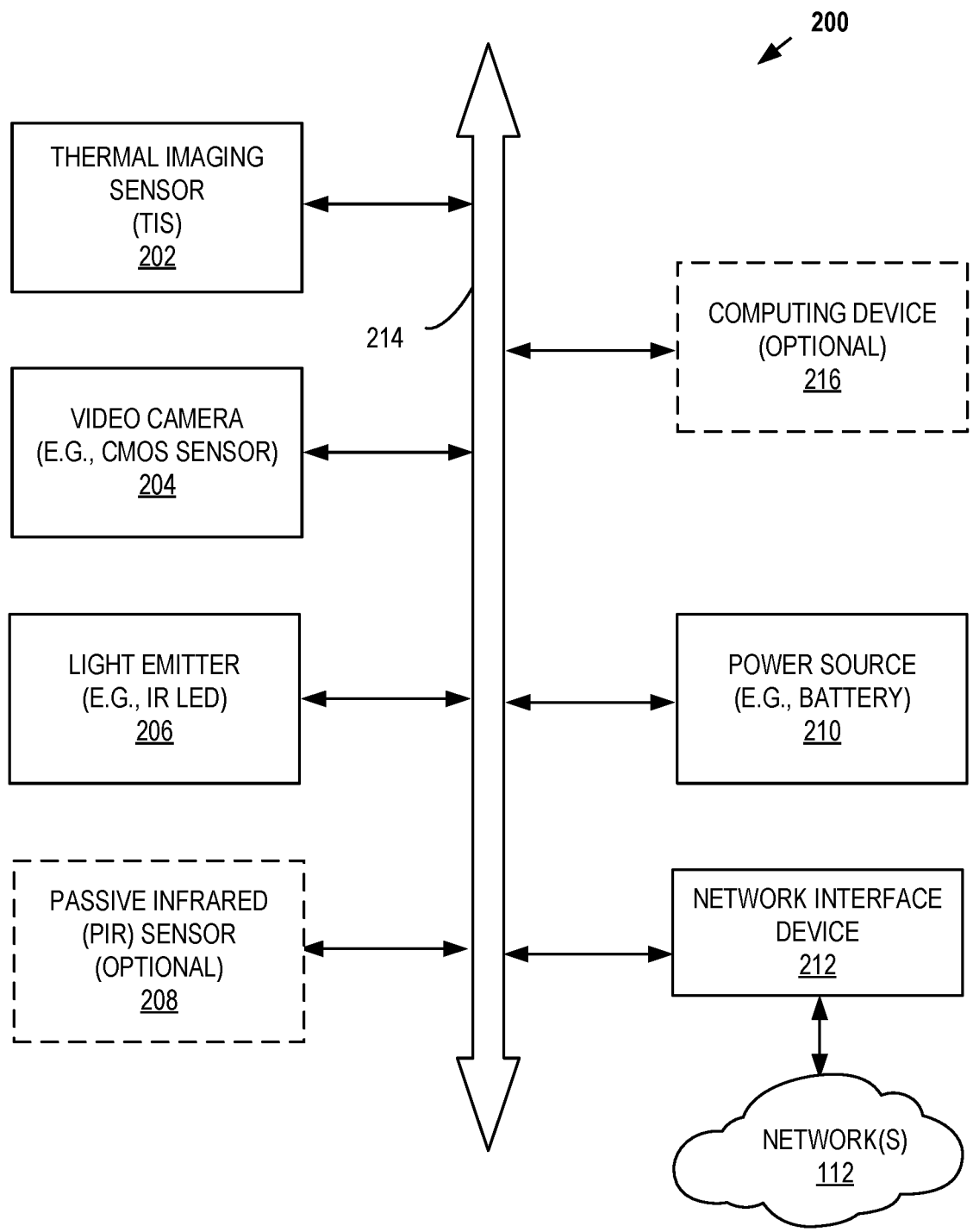
FIG. 2 is a block diagram of example aspects of an example security camera system, in accordance with some embodiments of the present disclosure.

The system can also include one or more computing devices that can each include a part of the security hub system 104 (e.g., see computing device 110 and computing device 111). An implementation for any one of the computing devices 110 and 111 is depicted in greater detail in FIG. 4. An implementation for any one of the cameras 102*a*, 102*b*, and 102*c* is depicted in FIG. 2. The cameras can also include a computing device in some embodiments (e.g., see FIG. 2 and the computing device depicted in FIG. 3).

The system 100 is also shown including one or more local area networks and/or wide area networks 112 (LAN/WAN network(s) 112) which are shown communicatively coupling the security cameras, computing devices, and additional sensing devices depicted in FIG. 1. The LAN/WAN network(s) 112 can include one or more local area networks (LAN(s)) and/or one or more wide area networks (WAN(s)). The LAN/WAN network(s) 112 can include the Internet and/or any other type of interconnected communications network. The LAN/WAN network(s) 112 can also include a single computer network or a telecommunications network. More specifically, the LAN/WAN network(s) 112 can include a local area network (LAN) such as a private computer network that connects computers in small physical areas, a wide area network (WAN) to connect computers located in different geographical locations, and/or a metropolitan area network (MAN)—also known as a middle area network—to connect computers in a geographic area larger than that covered by a large LAN but smaller than the area covered by a WAN.

Each shown component of the system 100 can include a computer system which can include memory that can include media. The media can include or be volatile memory components, non-volatile memory components, or a combination of such. In some embodiments, the memory is a storage system. An example of a storage system is a SSD. In some embodiments, the memory is a hybrid memory/storage sub-system. In general, each of the computer systems can include a host system that uses the memory. For example, the host system can include a memory and a processing device. The host system can include or be coupled to the memory so that the host system can read data from or write data to the memory. The host system can be coupled to the memory via a physical host interface. The physical host interface can provide an interface for passing control, address, data, and other signals between the memory and the host system.

A memory system controller (hereinafter referred to as "controller") can communicate with the memory components to perform operations such as reading data, writing data, or erasing data at the memory components and other such operations. The controller can include hardware such as one or more integrated circuits and/or discrete components, a buffer memory, or a combination thereof. The controller can be a microcontroller, special purpose logic circuitry (e.g., a field programmable gate array (FPGA), an application specific integrated circuit (ASIC), etc.), or other suitable processors. The controller can include a processor (processing device) configured to execute instructions stored in local memory. The local memory of the controller can include an embedded memory configured to store instructions for performing various processes, operations, logic flows, and routines that control operation of the memory, including handling communications between the memory and the host system. In general, the controller can receive commands or operations from the host system and can convert the commands or operations into instructions or appropriate commands to achieve the predetermined desired access to the memory components.

The memory can also include additional circuitry or components. In some embodiments, the memory can include a cache or buffer (e.g., DRAM) and address circuitry (e.g., a row decoder and a column decoder) that can receive an address from the controller and decode the address to access the memory components.

In some aspects of the present disclosure, the memory can include all or parts of the SHS 104. In some embodiments, the controller includes at least a portion of the SHS 104. For example, the controller can include a processor (processing device) configured to execute instructions stored in local memory for performing the operations described herein such as the operations described herein associated with the SHS 104. In some embodiments, the SHS 104 is part of the host system, an application, or an operating system.

The SHS 104 can use the memory, the memory components, and the host system to implement technologies for sensing a scene or field of view by at least a TIS and operating a security camera and hub accordingly. Further details with regards to the operations of the SHS 104 are described below. As shown in FIG. 1, the system 100 can include the parts of the SHS 104 within one or more electronic devices (e.g., computing devices 110 and 111).

In some embodiments, the technologies disclosed herein can include apparatus, that has at least a security camera and the security camera has an event handler, a TIS, a video recorder, and a transmitter. The security camera can also have a computing device or the camera can be communicatively coupled to a computing device. The security camera can be configured to run in a plurality of modes including a low-power mode and an active mode. The event handler of the camera can be configured to identify a triggering event while the camera is running in the lower-power mode. The TIS of the camera can be configured to record, in a field of view, TIS data in response to identifying the triggering event. The TIS data is derived from infrared radiation. The computing device (either in the camera or connected to the camera) can be configured to analyze the TIS data to determine whether to perform additional recording in the field of view by the camera. The video recorder of the camera can be configured to record, in the field of view, a video while the camera is running in the active mode, in response to the computing device determining to perform additional recording in the field of view by the camera. And, the transmitter of the camera can be configured to transmit the video to a security hub system. In some embodiments, including some of the aforesaid embodiments, the camera can include a PIR sensor. The PIR sensor of the camera can be configured to detect motion or a certain increase in temperature in the field of view, and the triggering event can include the PIR sensor detecting motion or a certain increase in temperature in the field of view.

In some embodiments, the technologies disclosed herein can include a system that has one or more networked computers that includes a security hub system such as the SHS 104. The system can also have a security camera, configured to run in a plurality of modes including a low-power mode and an active mode. The system can also include an event handler of the camera, configured to identify a triggering event while the camera is running in the lower-power mode. The system can also include a TIS of the camera, configured to record, in a field of view, TIS data in response to identifying the triggering event. The TIS data is derived from infrared radiation. The system can also include a computing device in the camera or communicatively coupled to the camera, configured to analyze the TIS data to determine whether to perform additional recording in the field of view by the camera. The system can also include a video recorder of the camera, configured to record, in the field of view, a video while the camera is running in the active mode, in response to the computing device determining to perform additional recording in the field of view by the camera. And, the system can include a transmitter of the camera, configured to transmit, over the video to the security hub system.

FIG. 2 is a block diagram of example aspects of an example security camera system 200, in accordance with some embodiments of the present disclosure. FIG. 2 illustrates at least one part of the security camera system 200 (e.g., see optional computing device 216) within which a set of instructions, for causing a machine of the system 200 to perform one or more aspects of any one or more of the methodologies discussed herein, can be executed. In alternative embodiments, the machine can be connected (e.g., networked) to other machines in a LAN, an intranet, an extranet, and/or the Internet. The machine can operate in the capacity of a client machine in client-server network environment, as a peer machine in a peer-to-peer (or distributed) network environment, or as a client machine in a cloud computing infrastructure or environment.

Figure 3:
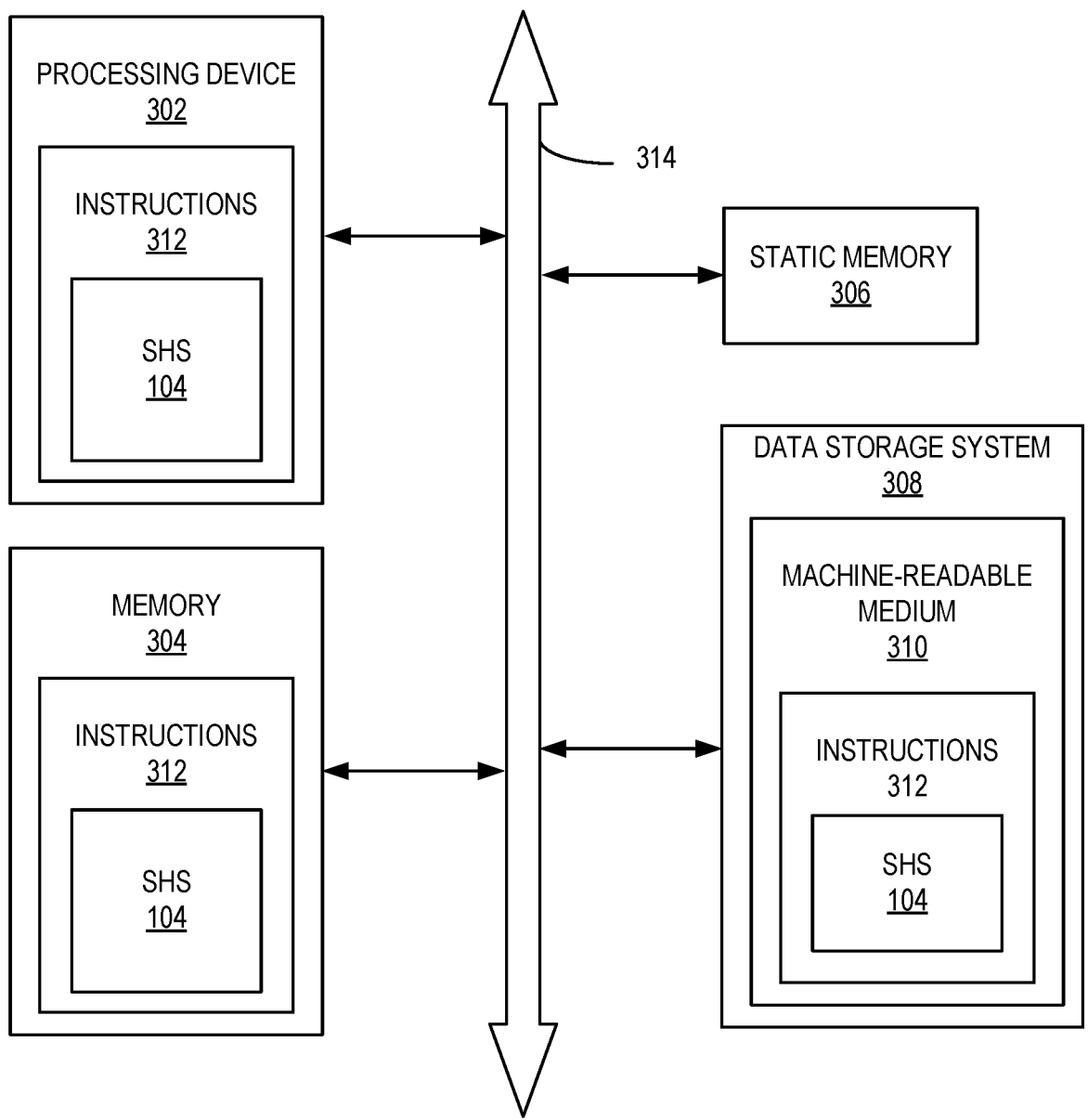
FIG. 3 is a block diagram of example aspects of an example computer system that can be installed in or connected to a security camera system, in accordance with some embodiments of the present disclosure

The security camera system 200 includes a thermal imaging sensor 202 (TIS 202), a video camera 204 (such as a camera having a CMOS image sensor), a light emitter 206 (e.g., an IR LED), optionally a passive infrared sensor 208 (PIR sensor 208), a power source 210 (e.g., a battery), a network interface device 212, a bus 214, and optionally a computing device 216 (e.g., see computer system 300 depicted in FIG. 3). The TIS 202, the video camera 204, the light emitter 206, the optional PIR sensor 208, the power source 210, the network interface device 212, and the optional computing device 216 can be communicatively coupled with each other via bus 214. The network interface device 212 can communicate with other devices over the LAN/WAN network(s) 112 of FIG. 1. An example computing device like the optional computing device 216 is described in further detail in the section describing computer system 300 depicted in FIG. 3.

The video camera 204 can include a CMOS image sensor, and imaging of the video camera is based on captured light within the visible light spectrum.

The light emitter 206 can be part of the TIS 202 or a separate part of the security camera system 200 (as depicted). The light emitter 206 can include a light emitting diode (LED). The light emitter 206 can be a light source for the field of view of the security camera system 200.

The optional PIR sensor 208 can be any type of infrared radiation sensor, such as a PIR sensor for detecting motion with captured infrared radiation. A key feature of the optional PIR sensor 208 is that it is less robust (e.g., lower performing and/or lower resolution) than the TIS 202.

The power source 210 can include a battery and can include or be any type of known power source for a camera.

Non-visual environment monitoring and monitoring of human presence can be utilized in applications for security and safety, energy savings, fire detection, people counting and behavior analysis. One technology used for these kinds of applications is infrared technology, in particular uncooled thermal imaging. The optional PIR sensor 208 can include infrared technology, and in particular, uncooled thermal imaging.

The TIS 202 can provide a higher accuracy and negligible false alarm rate over the optional PIR sensor 208.

In some embodiments, the TIS 202 can include an uncooled thermo-mechanical bi-material microelement sensor, which converts incident infrared radiation into a micromechanical displacement. Also, it is to be understood that the TIS 202 can be or alternatively include another type of thermal sensor instead of an uncooled thermo-mechanical bi-material microelement sensor. The microelement is often referred to as a micro-cantilever or micro-mirror. The operational principle is based on the bi-material effect, where a material compound mismatch of coefficients of thermal expansion leads to a micromechanical motion upon temperature change. In some implementations one microelement represents one radiation sensing pixel and the sensors have an array of microelements (e.g., micro-cantilevers and/or micro mirrors). In some embodiments, the TIS can include a CMOS image sensor to capture the image of the light spots generated by the micro mirrors.

Every object in an environment has a unique thermal footprint and therefore thermal imaging with the TIS 202 offers detection of human presence in an enclosed environment with a very high accuracy and negligible false alarm rate. Human body temperature and emissivity in the long wave infrared band is in most cases distinguishably higher than the thermal footprint of typical indoor and outdoor environmental surroundings. Thermal imaging, via the TIS 202, with a limited spatial resolution can be sufficient to accurately detect humans at short distances without revealing the individual's identity. This aspect of environmental and human detection and monitoring is of general interest with regards to privacy protection. Current thermal imaging technology solutions are inadequate for low-cost, high-volume applications due to their production complexity and expense. A need exists for ubiquitous limited spatial resolution infrared imagers at a commodity price. The TIS 202 is an example of a potentially inexpensive thermal imager with limited spatial resolution based on an uncooled thermo-mechanical bi-material microelement sensor, which converts incident infrared radiation into a micromechanical displacement.

The TIS 202 is an intermediate level device (e.g., in performance and/or in sensing resolution) between a passive infrared sensor (e.g., the PIR sensor 208) and a full featured image sensor (video camera 204). The TIS 202 differs from the video camera 204 in that the imaging of the video camera 204 is based on visible light or radiation within the visible light spectrum. The TIS 202, in most embodiments, is based on infrared radiation. The TIS 202 differs from the optional PIR sensor 208 in that it can have a different structure than the PIR sensor and the PIR sensor has less spatial resolution than the TIS 202.

In embodiments where the TIS 202 includes an array of microelements (e.g., micro-cantilevers and/or micro mirrors), the sensitivity and/or precision of the TIS can be dynamically adjusted (e.g., based on a user request) by changing the methods to measure the positions of the light spots of the microelements captured in an image of the imaging surface of the TIS. A less computationally demanding method can be implemented in a processor provided in the security camera system 200 (e.g., see computing device 216). And, a more computationally demanding method can be implemented on a separate device, such as an auxiliary device (e.g., see computer system 400 depicted in FIG. 4) connected physically to the security camera system 200 or connected in a local area network or a remote server connected in the Internet (e.g., connected over network(s) 112).

In embodiments where the TIS 202 includes an array of microelements, the radiation intensity measured at each microelement can be a function of the displacement of a light spot reflected on to the image surface by the corresponding microelement. When the light from the light source (e.g., light emitter 206) emits on the array of microelements, the microelements reflect the light to form the light spots on the imaging surface of the TIS 202. The infrared radiation absorbed in the microelements causes the microelements to rotate and thus move the light spots on the imaging surface of the TIS 202. The higher the infrared radiation intensity influx onto a microelement, the further the corresponding movement of the light spot reflected by the microelement on the imaging surface. The distances of the light spots moved by the microelements are a function of the responsivity of the microelements and the geometry of the optical system. For example, the distance of a light spot moved by a microelement is a function of the rotation of the microelement per unit of power absorbed in the microelement and a function of a distance that a light spot moves per unit of microelement rotation.

When the physical properties of the TIS 202 are constrained and fixated, e.g., the microelements are fixed, the optical path between the light source and the imaging surface can be in a constant position to another; and, further when the thermo-mechanical properties of the microelements and the properties of the TIS 202 are constrained, the radiation sensitivity of the TIS is determined by the degree of precision of which the moving dots or moving patterns can be allocated.

In some embodiments, a light spot on the imaging surface of the TIS 202 can move to a position by distance Y as a result of a microelement rotation. The precision of determining the displacement Y can depend on the following factors: (A) the quality of the light spot as created by the TIS 202 (e.g., size, shape, intensity of spot or pattern), (B) accuracy/level of precision of detection of light spots on the image plane of the TIS (or photodetector, or camera of the TIS, for example the performance and quality of the CMOS image sensor, its pixel size, pixel sensitivity, integration time for the TIS), (C) the methods used to detect the light spots and determine their displacements, and (D) how much processing power is available to execute the processes.

The processes used to calculate the magnitude of dot displacements or the pattern change on the image surface of the TIS 202 can have a significant impact on the sensitivity of the TIS 202

The image from the image plane of the TIS 202 (e.g., from the photodetector of the TIS 202) can be processed on the computing device or the signal processing unit as an input (e.g., see computing device 216 or computer system 400). Through the processing of the image obtained from the image plane of the TIS 202, the computing device or the signal processing unit can generate a thermal image by converting for example light spot movements, or pattern shifts, into an image representing radiation (or thermal) intensity, which can be further interpreted by the human eye or further image analysis algorithms (e.g., such as in the operations of block 508 shown in FIG. 5). The computing device that performs the computation to generate the thermal image from the optical images of light spot movements, or pattern shifts, does not have to be physically attached to the TIS 202 (e.g., see bus 214, network interface device 212, network(s) 112, etc.). The optical image from the image plane of the TIS 202 showing the light spot movements, or pattern shifts can be used as an input to the computing device that converts the optical image to a thermal image. For example, the computing device in FIG. 3 or FIG. 4 can convert the optical image to a thermal image. Alternatively, in some embodiments, a signal processor or computing device in the TIS 202 can convert the optical image to a thermal image.

For example, when the image of the light spots on the imaging surface of the TIS 202, as captured by the photodetector of the TIS, is analyzed by a relatively high-performance computing device (e.g., FPGA, ASIC or processor), the positions of the light spots can be determined at a relatively high level of precision using a sophisticated and computationally intensive method. Such method can include for example a Gaussian or polynomial fit to each light spot and move the fit with the displacement of the spot on the image plane of the TIS 202. The determination of a light spot fit can be very precise, thus even relatively small displacements of spots can be detected. The improved precision in measuring the positions of the light spots in the image improves the sensitivity and/or precision of the TIS 202. These aforesaid features can improve the operations of block 508 depicted in FIG. 5 (e.g., improve analyzing the TIS data outputted by the TIS).

However, when the same image of the light spots on the imaging surface, as captured by the photodetector of the TIS 202, is analyzed using a relatively low-cost computing device (e.g., such as a micro-controller), the positions of the light spots can be determined using a simplified, computationally efficient method at a relatively low level of precision. Such a method can include a simple threshold method of determining the light spot movements at a relatively coarse level. The reduced computation intensity allows the use of low-cost computing hardware in generating the radiation/temperature measurements, which can be implemented in the TIS 202 to reduce the bandwidth and/or power consumption requirements in the communications over a computer network by transmitting the radiation/temperature measurements instead of the full image of the light spots.

A relatively high-performing computing device can have sufficient computational power to allow light spot movement detection at a "sub-pixel" precision. For example, when the light sport movement detection has a precision at 0.01 pixel increment level, the thermal radiation can be detected at the increment of 0.048 W/m2 (=4.8 W/M2*0.01 pixel). Thus, the accuracy of the method used to measure/calculate the movement of a light spot can have a significant impact on the thermal sensitivity of the TIS 202.

Distinguishing and tracing individual mirror patterns in an array can be computational demanding. In such case relatively high-performing computing device can be used to maximize each light spot's dynamic range and enable a high target temperature detection range (temperature span) as the light spots might overlap or travel beyond its intrinsic spot-to-spot pitch distance and identifying and tracing individual light spots might be necessary for high dynamic range.

To improve the precision in determining the light spot movement or light pattern changes, the computing device can optionally use computer vision or image processing analysis, such as blob detection, blob count, blob tracking, threshold detection, etc.

Averaging of images from the image plane can reduce noise and to increase accuracy in the determination of the position of a light spot. In such instances, additional computational power can be used for performing averaging and noise suppression.

The accuracy of the positions of the light spots can be dynamically adjusted based on the resolution of the image of the light spots. Increasing the resolution of the image of the light spots can improve the sensitivity and/or precision, as well as the computation involved, the bandwidth for transmission of the image, and/or the power consumption in computation and/or transmission.

The aforesaid features can improve the operations of block 508 depicted in FIG. 5 (e.g., improve analysis of the TIS data outputted by the TIS).

FIG. 3 is a block diagram of example aspects of an example computer system 300 that can be installed in or connected to a security camera system, in accordance with some embodiments of the present disclosure (e.g., see optional computing device 216 depicted in FIG. 2). FIG. 2 illustrates parts of the computer system 300 within which a set of instructions, for causing a machine of the system to perform aspect(s) of any one or more of the methodologies discussed herein, can be executed. In some embodiments, the computer system 300 can correspond to a host system that includes, is coupled to, or utilizes memory or can be used to perform the operations of a controller (e.g., to execute an operating system to perform operations corresponding to one or more aspects of the SHS 104 shown in FIG. 1). In alternative embodiments, the machine can be connected (e.g., networked) to other machines in a LAN, an intranet, an extranet, and/or the Internet. The machine can operate in the capacity of a client machine in client-server network environment, as a peer machine in a peer-to-peer (or distributed) network environment, or a client machine in a cloud computing infrastructure or environment.

The machine of system 300 can be any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform aspect(s) of any one or more of the methodologies discussed herein.

The example computer system 300 includes a processing device 302, a main memory 304 (e.g., read-only memory (ROM), flash memory, dynamic random-access memory (DRAM), etc.), a static memory 306 (e.g., flash memory, static random-access memory (SRAM), etc.), and a data storage system 308, which communicate with each other via bus 314.

The processing device 302 represents one or more general-purpose processing devices such as a microprocessor, a central processing unit, or the like. More particularly, the processing device can be a microprocessor or a processor implementing other instruction sets, or processors implementing a combination of instruction sets. The processing device 302 can also be one or more special-purpose processing devices such as an application specific integrated circuit (ASIC), a field programmable gate array (FPGA), a digital signal processor (DSP), network processor, or the like. The processing device 302 is configured to execute instructions 312 for performing some of the operations discussed herein, such as operations associated with the SHS 104 shown in FIG. 1. The computer system 300 can further include a network interface device (e.g., see network interface 212) to communicate over the LAN/WAN network(s) 112 of FIG. 1. The network interface device for system 300 is not shown since system 300 is an example of a computing device that can be installed in or connected to a security camera system that includes a network interface device (e.g., see security camera system 200).

Also, not shown in FIG. 3, the computer system 300 can include an input/output interface, such as for receiving feedback from a feedback source external to systems 200 and 300. The input/output interface can include a user interface to receive user input as feedback on TIS data.

The data storage system 308 can include a machine-readable storage medium 310 (also known as a computer-readable medium) on which is stored one or more sets of instructions 312 or software embodying aspect(s) of any one or more of the methodologies or functions described herein, such as operations associated with the SHS 104 shown in FIG. 1. The instructions 312 can also reside, completely or at least partially, within the main memory 304 and/or within the processing device 302 during execution thereof by the computer system 300, the main memory 304 and the processing device 302 also constituting machine-readable storage media.

In one embodiment, the instructions 312 include instructions to implement functionality corresponding to the SHS 104 shown in FIG. 1. While the machine-readable storage medium 310 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform aspect(s) of any one or more of the methodologies of the present disclosure. The term "machine-readable storage medium" shall accordingly be taken to include, but not be limited to, solid-state memories, optical media, and magnetic media.

Figure 4:
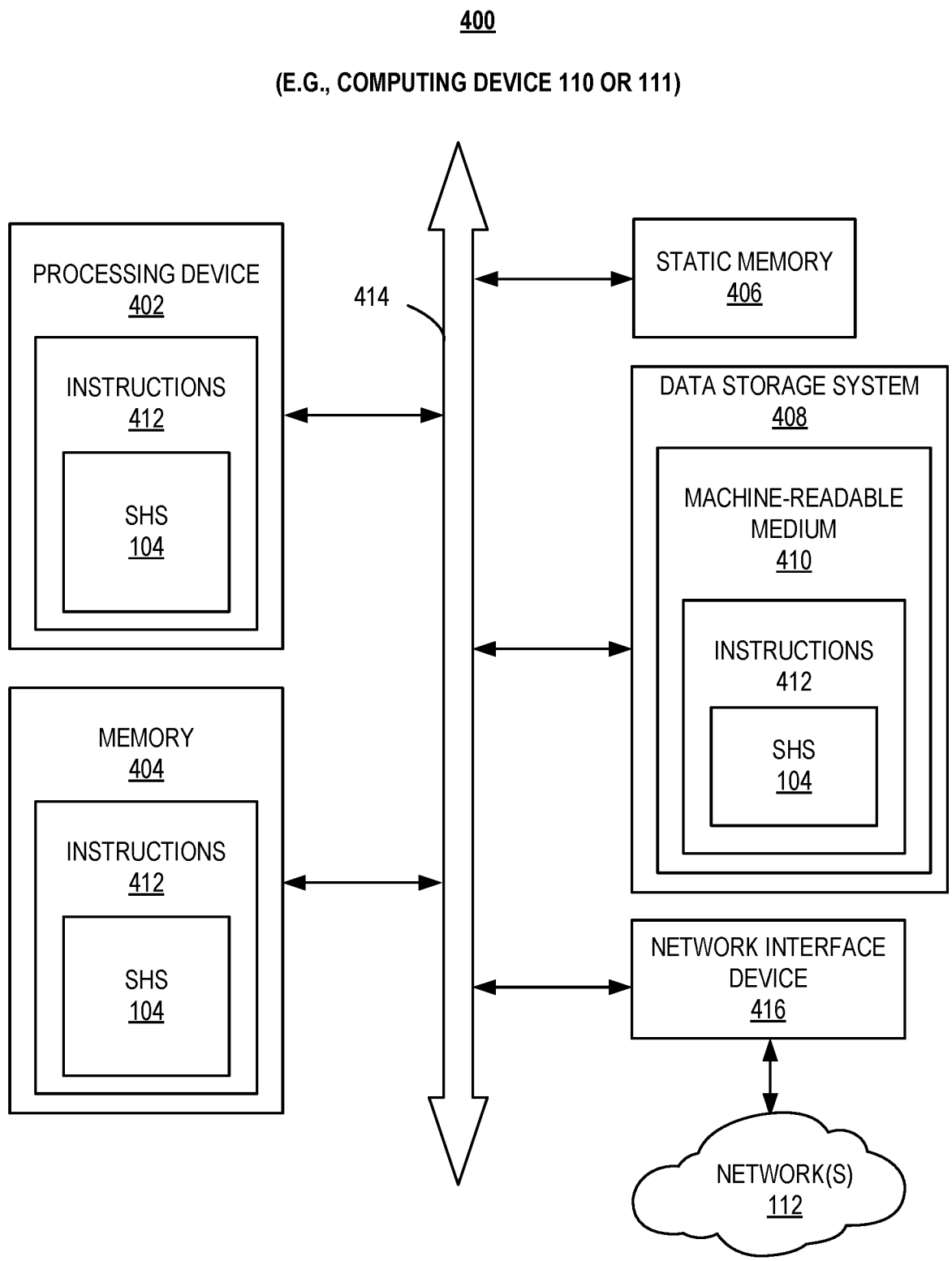
FIG. 4 is a block diagram of example aspects of an example computer system, in accordance with some embodiments of the present disclosure.

FIG. 4 is a block diagram of example aspects of an example computer system 400, in accordance with some embodiments of the present disclosure (e.g., see computing device 110 or 111). FIG. 4 illustrates parts of the computer system 400 within which a set of instructions, for causing a machine of the system to perform aspect(s) of any one or more of the methodologies discussed herein, can be executed. In some embodiments, the computer system 400 can correspond to a host system that includes, is coupled to, or utilizes memory or can be used to perform the operations of a controller (e.g., to execute an operating system to perform operations corresponding to the SHS 104 shown in FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine, such as an automated teller machine (ATM). Further, while a single machine is illustrated, the term "machine" shall also be taken to include any collection of machines that individually or jointly execute a set (or multiple sets) of instructions to perform aspect(s) of any one or more of the methodologies discussed herein.

The example computer system 400 includes a processing device 402, a main memory 404 (e.g., read-only memory (ROM), flash memory, dynamic random-access memory (DRAM), etc.), a static memory 406 (e.g., flash memory, static random-access memory (SRAM), etc.), and a data storage system 408, which communicate with each other via bus 414.

The processing device 402 represents one or more general-purpose processing devices such as a microprocessor, a central processing unit, or the like. More particularly, the processing device can be a microprocessor or a processor implementing other instruction sets, or processors implementing a combination of instruction sets. The processing device 402 can also be one or more special-purpose processing devices such as an application specific integrated circuit (ASIC), a field programmable gate array (FPGA), a digital signal processor (DSP), network processor, or the like. The processing device 402 is configured to execute instructions 412 for performing the operations discussed herein, such as operations associated with the SHS 104 shown in FIG. 1. The computer system 400 can further include a network interface device 416 to communicate over the LAN/WAN network(s) 112 of FIG. 1.

Also, not shown in FIG. 4, the computer system 400 can include an input/output interface, such as for receiving feedback from a feedback source external to system 400. The input/output interface can include a user interface to receive user input as feedback on TIS data.

The data storage system 408 can include a machine-readable storage medium 410 (also known as a computer-readable medium) on which is stored one or more sets of instructions 412 or software embodying aspect(s) of any one or more of the methodologies or functions described herein, such as operations associated with the SHS 104 shown in FIG. 1. The instructions 412 can also reside, completely or at least partially, within the main memory 404 and/or within the processing device 402 during execution thereof by the computer system 400, the main memory 404 and the processing device 402 also constituting machine-readable storage media.

In one embodiment, the instructions 412 include instructions to implement functionality corresponding to the SHS 104 shown in FIG. 1. While the machine-readable storage medium 410 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform aspect(s) of any one or more of the methodologies of the present disclosure. The term "machine-readable storage medium" shall accordingly be taken to include, but not be limited to, solid-state memories, optical media, and magnetic media.

Figure 6:
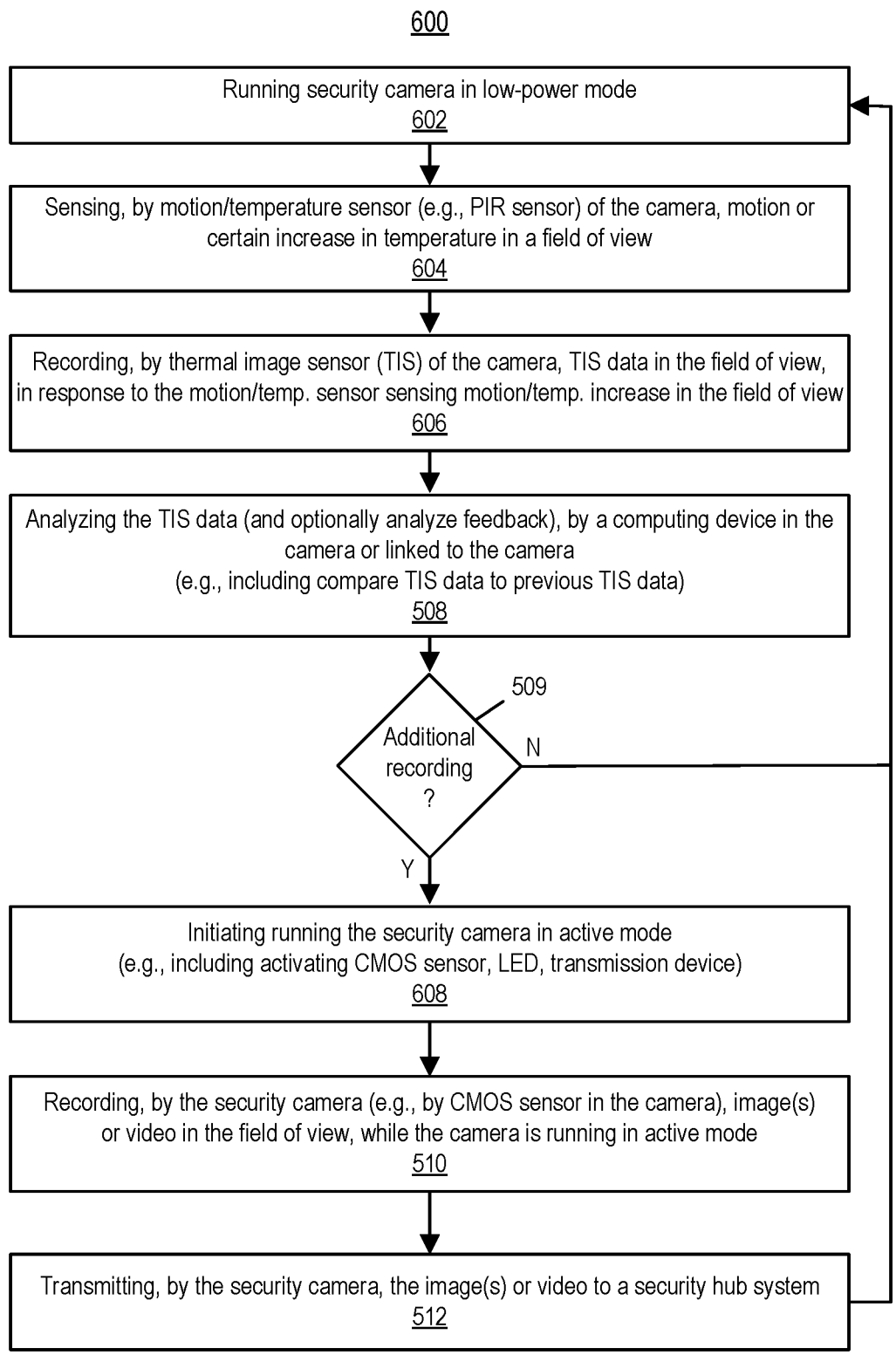
Figure 7:
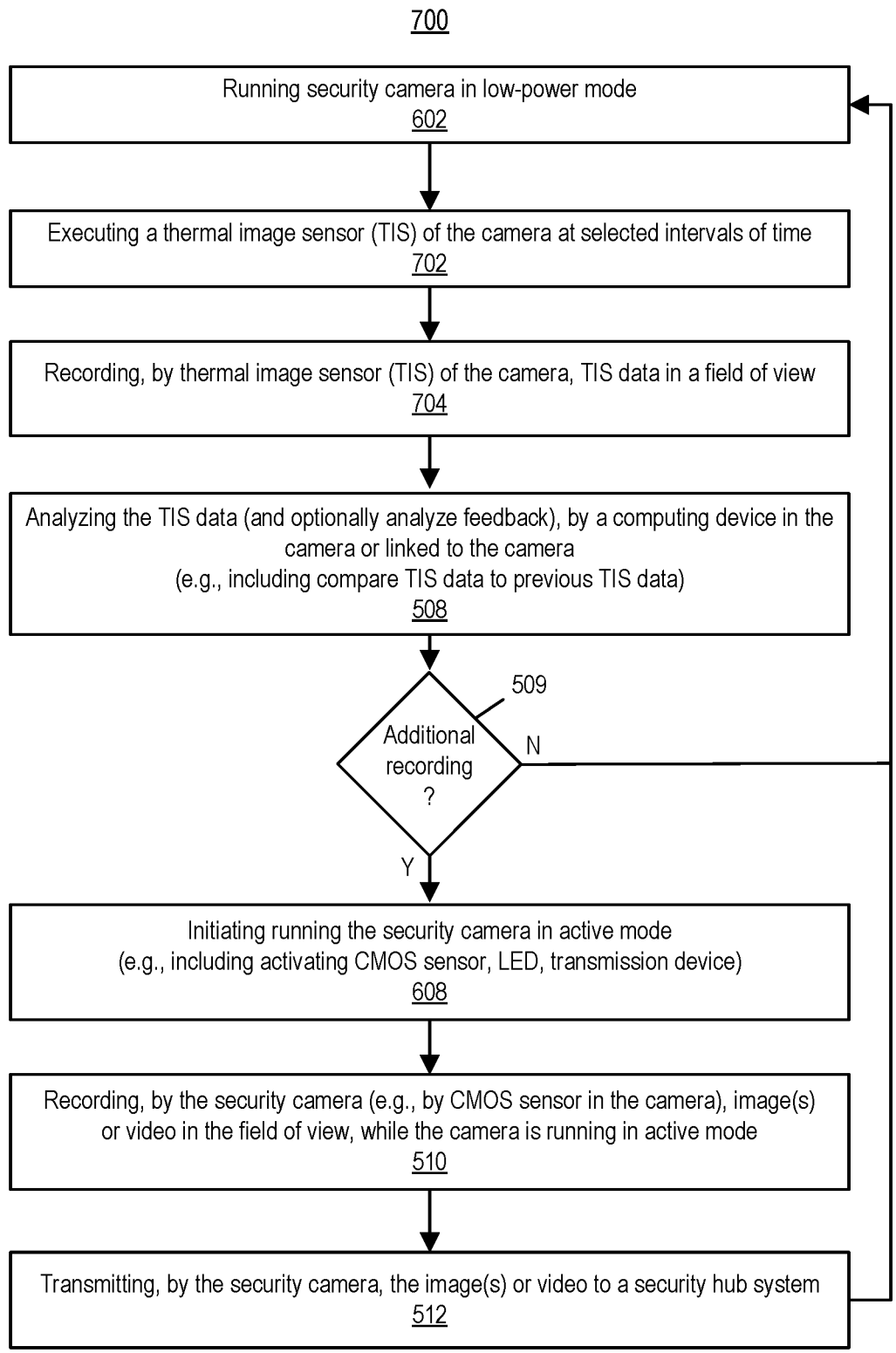

FIGS. 5, 6, and 7 are flow diagrams of example methods that can be implemented by parts of the system 100, in accordance with some embodiments of the present disclosure. The respective methods 500, 600, and 700 in FIGS. 5, 6, and 7 each have operations that can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, aspects of the methods can be performed by one or more aspects of a security camera (e.g., security camera 102a, 102b, or 102c), the SHS 104, and possibly an additional sensor (e.g., see additional sensing devices 106a, 106b, 106c, or 106d). Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

FIG. 5 is a flow diagram of example method 500 that utilizes a security camera having a thermal imaging sensor (TIS), in accordance with some embodiments of the present disclosure.

At block 502, the method 50 includes running a security camera (e.g., security camera 102a, 102b, 102c, or security camera system 200) in a low-power mode and waiting for a triggering event. For example, the method can include waiting for a sensor of the camera to detect a motion or certain increase in temperature.

At block 504, the method 500 includes identifying, by the camera, the triggering event. The identification of the triggering event can occur during the low-power mode. The identifying the triggering event can occur subsequent to or via receiving a software or hardware interrupt or via polling.

At block 506, the method 500 includes recording, by a TIS of the camera (e.g., see TIS 202), TIS data in a field of view, in response to identifying the triggering event. The TIS data is derived from infrared radiation.

At block 508, the method 500 includes analyzing the TIS data (and optionally analyzing feedback), by a computing device in the camera or linked to the camera (e.g., see computing device 110 in FIG. 1, computing device 111 in FIG. 1, or computing device 216 in FIG. 2). In some embodiments, CV algorithms that can perform the analyzing of the TIS data can be tuned for improved performance by receiving feedback on one or more events of the triggering event. For example, if a computing device of the camera or a security hub determines a significant event, but receives feedback that the event was not significant from a user, the camera can alter future determination behavior of the computing device. The feedback can be from further computer analysis of the event at the hub or the camera, or from a user observing the event streams and associated video.

In some embodiments, the analysis can include comparing the TIS data to previous TIS data from the same TIS.

At block 509, the method 500 includes determining whether to continue with additional recording of the field of view. The determination at block 509 is based at least partially on the analysis at block 508. When it is determined not to continue with additional recording of the field of view, the method 500 can return to block 502. In other words, when it is determined not to continue with additional recording of the field of view, the method 500 can return to running a security camera in a low-power mode and waiting for a triggering event at block 502.

At block 510, the method 500 includes recording, by the security camera (such as by a CMOS sensor in the camera, e.g., see video camera 204 depicted in FIG. 2), one or more images or a video in the field of view, while the camera is running in an active mode. The active mode can commence in response to the determination to continue with additional recording of the field of view. Also, the recording of the one or more images can occur in response to the determination to continue with additional recording of the field of view.

At block 512, the method 500 includes transmitting, by the security camera (such as by a transmitter of the security camera, e.g., see network interface device 212), the image(s) or the video to a security hub system (e.g., a part of SHS 104) over a computer network (e.g., see the LAN/WAN network(s) 112 of FIG. 1). Then the method 500 can repeat itself subsequent to the transmitting of the image(s) or the video.

FIG. 6 is a flow diagram of example method 600 that utilizes a security camera having a thermal imaging sensor (TIS) and a motion and/or temperature sensor, in accordance with some embodiments of the present disclosure. As shown, method 600 includes the operations of blocks 508, 509, 510, and 512 of method 500 as well as additional operations of blocks 602, 604, 606, and 608.

At block 602, the method 600 includes running the security camera in a low-power mode (e.g., see security camera 102a, 102b, 102c, or security camera system 200). At block 604, the method 600 includes sensing, by a motion and/or temperature sensor (e.g., PIR sensor such as PIR sensor 208) of the camera, a motion or a certain increase in temperature in a field of view. The sensing of the motion or certain temperature increase can occur during the low-power mode. At block 606, the method 600 includes recording, by a TIS of the camera (e.g., see TIS 202), TIS data in the field of view, in response to the motion and/or temperature sensor sensing a motion or a certain increase in temperature in a field of view. Then, at block 508, the method 600 continues with analyzing the TIS data.

At block 608, the method 600 includes initiating running the security camera in active mode. This initiation of the camera in active mode can be in response to the determining to continue with additional recording of the field of view, at block 509. Otherwise, the method 600 continues with block 602, in response to determining not to continue with addition recording of the field of view. The initiating of the running of the camera in active mode can include activating a CMOS image sensor (e.g., see video camera 204), an LED (e.g., see light emitter 206), a transmission device (e.g., see network interface device 212), or any combination thereof.

Then, at block 510, the method 600 includes recording, by the security camera (e.g., by the CMOS sensor in the camera), one or more images or a video in the field of view, while the camera is running in the active mode. At block 512, the method 600 then includes transmitting, by the security camera (such as by the transmitter of the camera), the image(s) or video to a security hub system.

FIG. 7 is a flow diagram of example method 700 that utilizes a security camera having a thermal imaging sensor (TIS) without a motion and/or temperature sensor, in accordance with some embodiments of the present disclosure. As shown, method 700 includes the operations of blocks 508, 509, 510, and 512 of method 500, the operations of blocks 602 and 608 of method 600, as well as additional operations of blocks 702 and 704.

At block 602, the method 700 includes running the security camera in a low-power mode (e.g., see security camera 102a, 102b, 102c, or security camera system 200).

At block 702, the method 700 includes executing a TIS of the camera at selected intervals of time (e.g., see TIS 202). At block 704, the method 700 includes recording, by the TIS, TIS data in a field of view per selected interval of time. The recording of the TIS data can occur during the low-power mode. Then, at block 508, the method 700 continues with analyzing the TIS data. Then, at block 608, the method 700 includes initiating running the security camera in active mode. This initiation of the camera in active mode can be in response to the determining to continue with additional recording of the field of view, at block 509. Otherwise, the method 700 continues with block 602, in response to determining not to continue with addition recording of the field of view. Then, at block 510, the method 700 includes recording, by the security camera, one or more images or a video in the field of view, while the camera is running in the active mode. At block 512, the method 700 then includes transmitting, by the security camera, the image(s) or video to a security hub system.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a predetermined desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A camera, comprising:
a passive infrared sensor;
a thermal image sensor; and
a further sensor configured to record video;
wherein in a first mode of operation, the thermal image sensor and the further sensor are inactive, while the passive infrared sensor is active to detect a triggering event;
wherein in response to the triggering event being detected, the camera is configured to operate in a second mode of operation;
wherein in the second mode of operation, the further sensor is inactive, while the thermal image sensor is active to determine whether to enter a third mode of operation; and
wherein in the third mode of operation, the further sensor is active.

2. The camera of claim 1, wherein in the second mode:
the thermal image sensor is configured to generate thermal image data of a scene in a field of view; and
the camera is configured to analyze the thermal image data to determine whether to enter the third mode.

3. The camera of claim 2, wherein in the third mode:
the further sensor is configured to generate video data of the scene in the field of view; and
the camera is configured to transmit the video data to a remote system.

4. The camera of claim 3, wherein the triggering event corresponds to motion in the field of view.

5. The camera of claim 3, wherein the triggering event corresponds to an increase in temperature in the field of view.

6. The camera of claim 3, wherein the camera is configured to analyze feedback on the thermal image data from a source external to the camera.

7. The camera of claim 3, wherein the camera is configured to compare the thermal image data to previous thermal image data.

8. The camera of claim 3, wherein the camera is configured to determine a region of interest in the thermal image data.

9. The camera of claim 3, wherein the camera includes a transmitter.

10. The camera of claim 9, further comprising:
a light emitting diode, wherein the camera is configured to activate the light emitting diode in the third mode.

11. A device, comprising:
a first sensor configured to detect presence of motion in a scene;
a second sensor having a plurality of thermal radiation sensing pixels configured to capture a thermal image of the scene at a first resolution; and
a third sensor configured to capture an image of the scene at a second resolution higher than the first resolution;
wherein in a first mode of operation, the second sensor and the third sensor are inactive, while the first sensor is active to detect an event;
wherein in response to the event being detected by the first sensor, the device is configured to operate in a second mode of operation;
wherein in the second mode of operation, the third sensor is inactive, while the second sensor is active to determine whether to enter a third mode of operation; and
wherein in the third mode of operation, the third sensor is active.

12. The device of claim 11, wherein in the second mode:
the second sensor is configured to generate thermal image data of the scene; and
the device is configured to analyze the thermal image data to determine whether to enter the third mode.

13. The device of claim 12, wherein in the third mode:
the third sensor is configured to generate video data of the scene; and
the device is configured to transmit the video data to a remote system.

14. The device of claim 13, further comprising:
a transmitter configured to communicate with the remote system.

15. The device of claim 14, further comprising:
a light emitting diode configured to be activated in the third mode.

* * * * *